United States Patent
Wiemker et al.

(10) Patent No.: US 9,536,318 B2
(45) Date of Patent: Jan. 3, 2017

(54) IMAGE PROCESSING DEVICE AND METHOD FOR DETECTING LINE STRUCTURES IN AN IMAGE DATA SET

(71) Applicant: KONINKLIJKE PHILIPS N.V., Eindhoven (NL)

(72) Inventors: Rafael Wiemker, Kisdorf (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/646,044

(22) PCT Filed: Dec. 2, 2013

(86) PCT No.: PCT/IB2013/060554
§ 371 (c)(1),
(2) Date: May 20, 2015

(87) PCT Pub. No.: WO2014/087313
PCT Pub. Date: Jun. 12, 2014

(65) Prior Publication Data
US 2015/0302602 A1 Oct. 22, 2015

Related U.S. Application Data

(60) Provisional application No. 61/732,562, filed on Dec. 3, 2012.

(51) Int. Cl.
*G06K 9/00* (2006.01)
*G06T 7/00* (2006.01)

(52) U.S. Cl.
CPC ......... *G06T 7/0083* (2013.01); *G06T 2200/04* (2013.01); *G06T 2207/10081* (2013.01);
(Continued)

(58) Field of Classification Search
None
See application file for complete search history.

(56) References Cited

U.S. PATENT DOCUMENTS

| | | |
|---|---|---|
| 4,930,519 A | 6/1990 | Anderson et al. |
| 8,150,120 B2 | 4/2012 | Gindele et al. |

(Continued)

FOREIGN PATENT DOCUMENTS

WO 2008035266 A2 3/2008

OTHER PUBLICATIONS

Bismuth et al. "A comparison of line enhancement techniques—Applications to guide-wire detection and respiratory motion tracking", 2009, Proc. of SPIE vol. 7259.*

(Continued)

*Primary Examiner* — Jason Heidemann

(57) ABSTRACT

The present invention relates to an image processing device for detecting line structures in an image data set. The device comprises a model definition unit (12) for defining a line model of a line structure to be detected, said line model comprising a number of voxels, a calculation unit (14) for calculating, per voxel of interest of said image data set, several correlation values of a correlation between said line model and an image area around said voxel of interest, said image area comprising a corresponding number of voxels as said line model, wherein for each of a number of different relative orientations of said line model with respect to said image area a respective correlation value is calculated, and a determining unit (16) for determining, per voxel of interest, the maximum correlation value from said calculated correlation values and the corresponding optimal orientation at which said maximum correlation value is obtained.

16 Claims, 3 Drawing Sheets

(52) U.S. Cl.
CPC ............... *G06T 2207/20012* (2013.01); *G06T 2207/20016* (2013.01); *G06T 2207/20221* (2013.01); *G06T 2207/30061* (2013.01)

(56) References Cited

U.S. PATENT DOCUMENTS

| | | | |
|---|---|---|---|
| 2005/0196024 A1* | 9/2005 | Kuhnigk | G06K 9/34 382/128 |
| 2007/0133894 A1* | 6/2007 | Kiraly | G06K 9/4609 382/260 |
| 2009/0129673 A1 | 5/2009 | Simon et al. | |
| 2011/0075920 A1* | 3/2011 | Wu | G06K 9/4638 382/160 |
| 2012/0330447 A1* | 12/2012 | Gerlach | G01B 11/24 700/95 |
| 2014/0105472 A1* | 4/2014 | Yin | G06T 7/0012 382/128 |

OTHER PUBLICATIONS

Bigun, J., et al.; Optimal Orientation Detection of Linear Symmetry; 1987; Proc. of IEEE Conf. on Computer Vision; pp. 433-438.

Chaudhuri, S., et al.; Detection of Blood Vessels in Retinal Images Using Two-Dimensional Matched Filters; 1989; IEEE Trans. on Medical Imaging; 8(3)263-269.

Lowell, J., et al.; Measurement of Retinal Vessel Widths from Fundus Images Based on 2-D Modeling; 2004; IEEE Trans. on Medical Imaging; 23(10)1196-1204.

Nowak, R. D., et al.; Optimally Weighted Highpass Filters Using Multiscale Analysis; 1996; IEEE Trans. on Image Analysis and Interpretation; pp. 224-229.

Saita, S., et al.; An Extraction Angorithm of Pulmonary Fissures from Multi-Slice CT Images; 2004; Proc. of SPIE-Medical Imaging; vol. 5370:1590-1597.

Ukil, S., et al.; Anatomy-Guided Lung Lobe Segmentation in X-Ray CT Images; 2009; IEEE Trans. on Medical Imaging; 28(2)202-214.

Wang, L., et al.; Template-Matching Approach to Edge Detection of Volume Data; 2001; IEEE Trans. on Medical Imaging and Augmented Reality; pp. 286-291.

Zhang, L., et al.; Atlas-driven lung lobe segmentation in volumetric X-ray CT Images; 2006; IEEE Trans. on Medical Imaging; 25(1)1-16.

\* cited by examiner

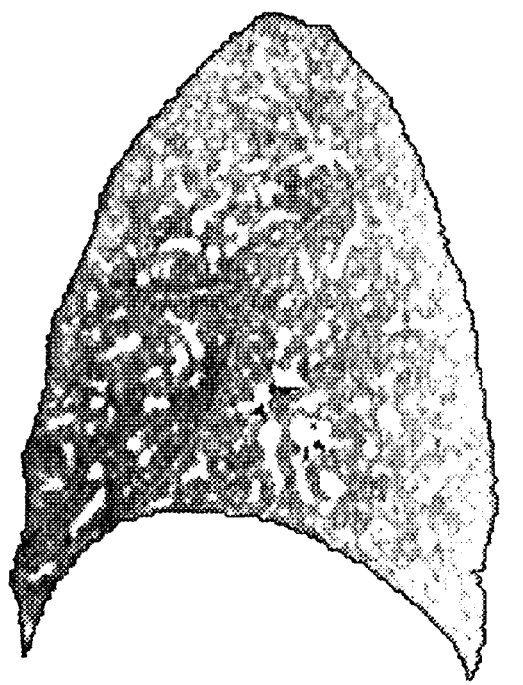
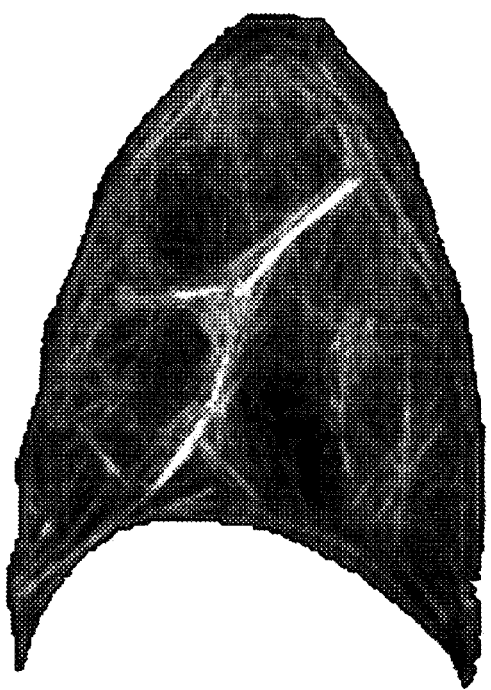
FIG.2A  FIG.2B
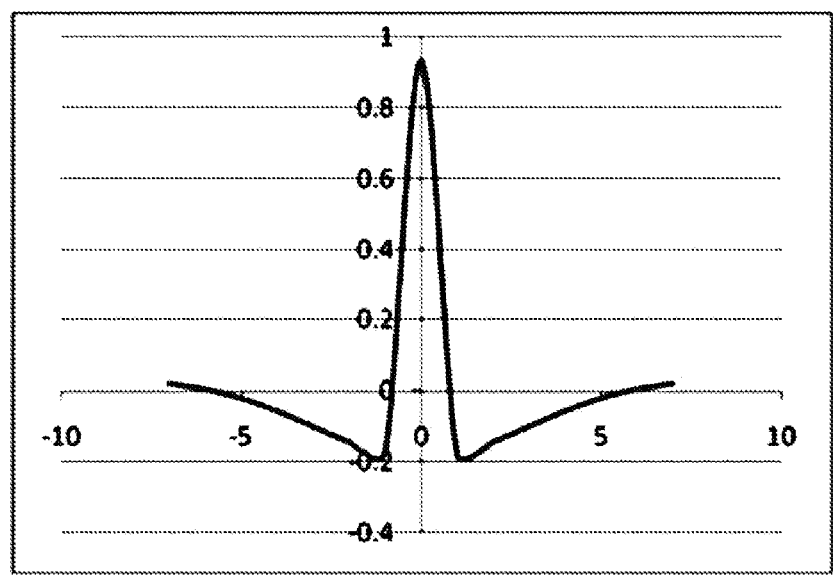
FIG.3

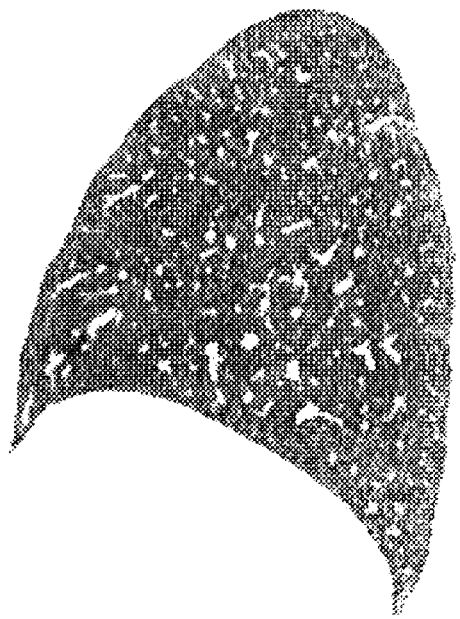 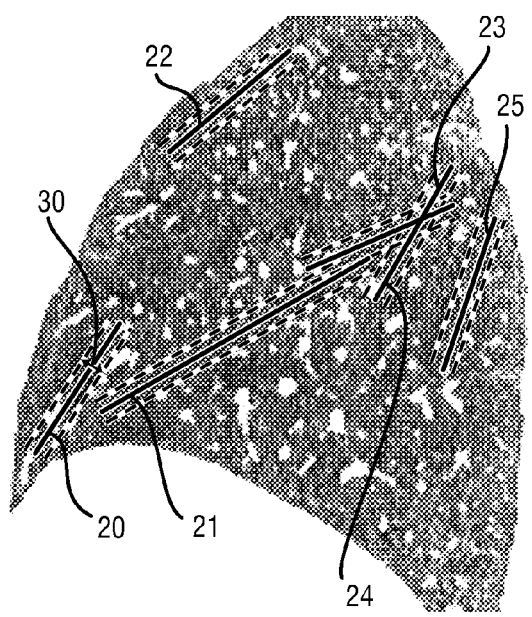
FIG.4A    FIG.4B
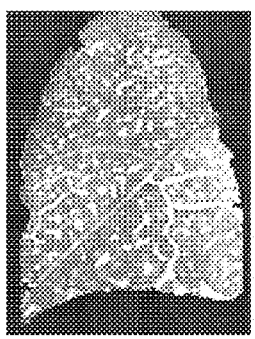 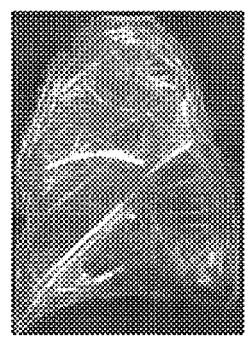 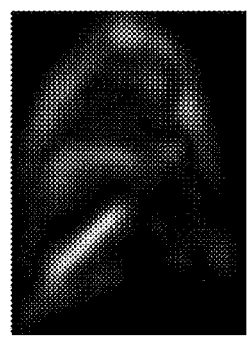 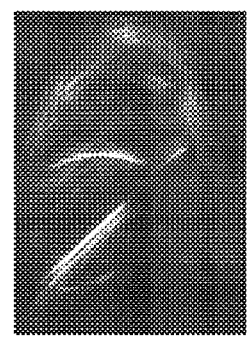
FIG.5A    FIG.5B    FIG.5C    FIG.5D

IMAGE PROCESSING DEVICE AND METHOD FOR DETECTING LINE STRUCTURES IN AN IMAGE DATA SET

CROSS REFERENCE TO RELATED APPLICATIONS

This application is a national filing of PCT application Ser. No. PCT/IB2013/060554, filed Dec. 2, 2013, published as WO 2014/087313 A1 on Jun. 12, 2014, which claims the benefit of U.S. provisional application Ser. No. 61/732,562 filed Dec. 2, 2012, which is incorporated herein by reference.

FIELD OF THE INVENTION

The present invention relates to an image processing device and a corresponding image processing method for detecting line structures in an image data set. The present invention particularly relates to the processing of medical images, such as x-ray images, for instance to find lobar fissures between the lung lobes.

BACKGROUND OF THE INVENTION

For many clinical applications the delineation of certain organs or organ parts is a necessary prerequisite. Whenever possible this task will be carried out by automatic unsupervised image processing. This often requires the detection of line structures in an image data set.

One field of application of an image processing device and method for the detection of line structures is the detection of lobar fissures between the lung lobes. Lobar fissures are thin boundaries that divide the lungs into five lobes; the left lung consists of two lobes and the right lung consists of three lobes. Typically, Computed Tomography (CT) is the modality of choice to capture three-dimensional image data of the human lungs. In this context, automatic segmentation of lung lobes from CT data is becoming clinically relevant as an enabler for, e.g., lobe-based quantitative analysis for diagnostics or more accurate interventional planning Attenuation of the fissures in CT scans is typically greater than the surrounding lung parenchyma, so that fissures appear as bright plate-like structures. However, segmentation of the lung lobes is still very challenging especially as the fissures are very thin and thus result in bright lines of only one or two pixel thickness in a cross-sectional view even on latest high resolution CT. For that reason, image noise, partial volume effect, but also different reconstruction kernels and imaging protocols heavily impede the extraction. Finally, lobe segmentation is further complicated once anatomical anomalies are present.

Many efforts have been done in the past decade on lung lobe segmentation from CT data. Most approaches typically build on a similar idea. At first, fissure detection is performed which usually results in a feature image, where the fissures are supposed to be highlighted and other structures are suppressed. This feature image is then integrated into a segmentation algorithm and watersheds, level-sets, graph optimization as well as atlas- and multi-atlas registration have been used for this purpose. As the calculation of the feature image is usually a first step in a more comprehensive segmentation framework, the detection of fissures is crucial and various different methods have been proposed. Zhang et al. (L. Zhang, E. Hoffman, and J. Reinhardt, "Atlas-driven lung lobe segmentation in volumetric X-ray CT images," IEEE Transactions On Medical Imaging 25(1), pp. 1-16, 2006) and Ukil et al. (S. Ukil and J. Reinhardt, "Anatomy-guided lung lobe segmentation in X-ray CT images", IEEE Transactions On Medical Imaging 28(2), pp. 202-214, 2009) made use of a 2-D multi-local level set extrinsic-curvature measure (MLSEC) which indeed detects the fissures but also highlights many other structures.

Another often used approach is to analyze the eigenvectors of the Hessian matrix of each voxel to measure if a voxel belongs to a locally plate-like object with bright appearance. From a rich set of features, the ones that are best suited for fissure detection are selected in a supervised learning step. Despite the fact that fissure detection has been addressed by using different approaches, there are still several limitations. Although theoretically the analysis of the eigenvectors of the Hessian matrix is able to detect the bright plate-like fissures, practically, the filter can give low responses for fissure voxels due to the challenges stated above. However, human observers can in most cases still clearly see the fissures even when the filter is not responding well. Obvious segmentation errors that likely happen from this improper detection are thus extremely striking. A comparison of the supervised filter to the Hessian filter showed that the supervised filter results in a better detection. Nevertheless, the main drawback is that this approach requires a large set of ground truth annotations to perform learning. The problem of detecting bright plate-like objects is implicitly solved by learning a combination of a set of low order features.

Thus, although a number of line detection algorithms are known, they fail in the following circumstances: The line to be detected is non-continuous (interrupted, consisting of single points); the line consists of line pieces, which may be slightly curved and are not collinear throughout the image (as assumed e.g. for a Hough-transform); the image is very noisy; or the line is fainter in contrast and intensity than the surrounding image structures.

SUMMARY OF THE INVENTION

It is an object of the present invention to provide an image processing device and a corresponding image processing method for detecting line structures in an image data set that overcome the above mentioned drawback and that can also be used in the above mentioned circumstances in which the known devices and methods fail.

In a first aspect of the present invention an image processing device is presented that comprises:
  a model definition unit for defining a line model of a line structure to be detected, said line model comprising a number of voxels,
  a calculation unit for calculating, per voxel of interest of said image data set, several correlation values of a correlation between said line model and an image area around said voxel of interest, said image area comprising a corresponding number of voxels as said line model, wherein for each of a number of different relative orientations of said line model with respect to said image area a respective correlation value is calculated, and
  a determining unit for determining, per voxel of interest, the maximum correlation value from said calculated correlation values and the corresponding optimal orientation at which said maximum correlation value is obtained.

In a further aspect of the present invention a corresponding image processing method is presented.

In yet another aspect of the present invention, there is provided a computer program which comprises program code means for causing a computer to perform the steps of the processing method when said computer program is carried out on a computer.

Preferred embodiments of the invention are defined in the dependent claims. It shall be understood that the claimed method and computer program have similar and/or identical preferred embodiments as the claimed device and as defined in the dependent claims.

According to the present invention a detection algorithm, which may also be regarded as a filter, is effectively applied that enhances the line structures to be detected (e.g. the fissures in a data set of a human lung) by measuring if a voxel belongs locally to (thin) line segments of bright appearance, e.g. in a cross-sectional view of an available 3D image data set. This new line enhancing filter tests multiple hypotheses for each voxel to capture possible line orientations and thus responds well even for faint line structures while giving low response for other objects.

The present invention can advantageously be applied for the delineation of the lobar fissures between the five lung lobes, lobar fissures in the liver, guide wires, biopsy needles, vessels, and bronchi in medical images, such as x-ray images obtained by an x-ray device or a CT scanner.

According to an embodiment said calculation unit is configured to calculate, per voxel of interest of said image data set, several correlation values of a linear correlation between said line model and an image area around said voxel of interest. Such a linear correlation can be calculated with limited efforts and is very robust against image noise as well as anatomical noise (unrelated closely adjacent structures).

In a practical implementation, said calculation unit is configured to calculate, per voxel of interest of said image data set, several correlation values of said linear correlation between said line model and an image area around said voxel of interest by calculating the ratio of the covariance of intensity values of said image area and said line model over the variance of the intensity values of said image area and the variance of the intensity values of said line model.

Generally, different line models for the line structure to be detected can be used. Further, the proposed line structure detection can be used to detect a line structure in a 3D image data set or in one or more 2D image data sets, e.g. image slices through a 3D image. In an embodiment said model definition unit is configured to define a two-dimensional rectangular line model having a predetermined length and width and wherein said calculation unit is configured to calculate, per pixel of interest of two-dimensional image data set, several correlation values of a correlation between said two-dimensional rectangular line model and a two-dimensional image area around said pixel of interest. A rectangular line model is particularly useful if the image data are available on an rectangular grid resulting in a limited amount and complexity of the required calculations. The length and width can be selected and/or adjusted, e.g. according to the corresponding dimension of the line structure to be detected.

Further, said model definition unit is preferably configured to define a two-dimensional rectangular line model having a larger extension in a direction along the line structure to be detected than in a direction perpendicular to the line structure to be detected. This provides that more signal is obtained along the line direction while not considering a large neighbourhood around the line.

Still further, said calculation unit and said determining unit are configured to repeat the steps of calculating and determining for different two-dimensional image data sets, in particular different image slices of a three-dimensional image data set. Thus, a line structure can be detected in a complete 3D image data set, whereby the detection method (particularly the steps of calculating the correlation values and determining the maximum correlation value) is generally carried out per 2D image slices.

In an alternative embodiment said model definition unit is configured to define a three-dimensional cuboidal line model having a predetermined length, width and height. According to this embodiment the detection method can be applied to a 3D image data set (without applying it separately to image slices).

Depending on the desired implementation, said model definition unit is configured to define a map of voxels or an analytical function as line model. The analytical function is preferably used if a specific appearance (voxel map) is not yet known, and exchanged for a voxel map in a later iteration as will be explained below.

In a preferred embodiment said model definition unit is configured to initially define a general line model of the line structure to be detected and to use the maximum correlation values and the corresponding optimal orientations obtained by use of said general line model to define a refined line model of the line structure to be detected, and wherein said calculation unit and said determining unit are configured to repeat the steps of calculating and determining by use of said refined line model. Thus, an iterative procedure using an adaptive improvement of the line model is provided leading to an increased accuracy of the detection of the line structure.

Preferably, said calculation unit is configured to calculate said correlation values only for voxels belonging to a predetermined region of interest and to determine if a voxel belongs to said predetermined region of interest based on a mask image indicating if a voxel belongs to said predetermined region of interest or a probability value of the probability that a voxel belongs to said predetermined region of interest. Said mask image can, for instance, be obtained from an image segmentation algorithm that e.g. segments a medical image to obtain an indication of organs or desired structures shown in the image. Such segmentation algorithms are widely known in the art. Improved methods also deliver a probability value that a voxel belongs to a predetermined region, e.g. an organ. The use of such a mask image reduces the amount of necessary calculations and further improves the accuracy of the detection of the line structure.

According to an embodiment said calculation unit is configured to calculate, per voxel of interest of said image data set, several correlation values of a correlation between said line model and an image area around said voxel of interest for different relative orientations of said line model with respect to said image area by rotating said line model and/or said image area around said voxel of interest to change the relative orientation. In this way the change of the orientation is easily obtained.

According to an embodiment the image processing device further comprises a post-processing unit for identifying within the image data set areas of voxels for which substantially the same optimal orientation has been found. The degree to which the optimal orientation of all voxels in a certain neighborhood agrees is computed and called the local orientedness, i.e. the orientation is an angle, the orientedness is a degree of agreement. This information can be advantageously exploited, in particular in still another embodiment according to which said post-processing unit is configured to determine, per voxel of interest, a local orientedness value and to multiply, per voxel of interest, said local orientedness value with the obtained maximum correlation value to obtain an amplified maximum correlation value. In that way, correlations are emphasized if the orientation angles in a certain neighborhood substantially agree.

BRIEF DESCRIPTION OF THE DRAWINGS

These and other aspects of the invention will be apparent from and elucidated with reference to the embodiment(s) described hereinafter. In the following drawings FIG. 2 shows an original image of the lung and an image of the lung constructed from the maximum correlation values obtained by processing said original image, FIG. 3 shows an example of a line model, FIG. 4 shows another original image of the lung and an image in which the detected line structures are indicated, and FIG. 5 shows an original image and several images obtained with different embodiments of the proposed method.

DETAILED DESCRIPTION OF THE INVENTION

Figure 1:
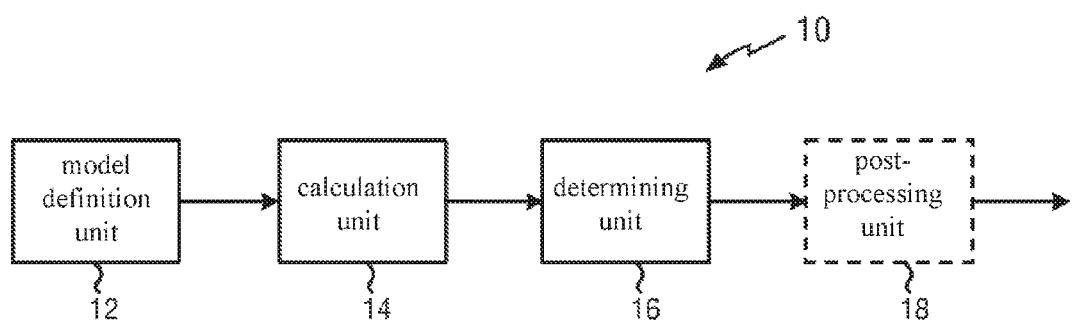
FIG. 1 shows a schematic diagram of an image processing device according to the present invention.

FIG. 1 shows a schematic diagram of an image processing device 10 according to the present invention. It comprises a model definition unit 12 for defining a line model of a line structure to be detected, said line model comprising a number of voxels. Further, a calculation unit 14 is provided for calculating, per voxel of interest of said image data set, several correlation values of a correlation between said line model and an image area around said voxel of interest, said image area comprising a corresponding number of voxels as said line model, wherein for each of a number of different relative orientations of said line model with respect to said image area a respective correlation value is calculated. Still further, a determining unit 16 is provided for determining, per voxel of interest, the maximum correlation value from said calculated correlation values and the corresponding optimal orientation at which said maximum correlation value is obtained.

Optionally, a post-processing unit 18 is provided for identifying within the image data set areas of voxels for which substantially the same optimal orientation has been found, to determine, per voxel of interest, a local orientedness value and to multiply, per voxel of interest, said local orientedness value with the obtained maximum correlation value to obtain an amplified maximum correlation value.

The obtained maximum correlation values can, for instance, be used to indicate the detected local structures in the original image data, e.g. in a 2D image, by replacing the original pixel value with the obtained maximum correlation value. Alternatively, a new image can be constructed by using as pixel (or voxel) values the obtained orientedness values, or the product of maximum correlation and local orientedness. The obtained orientation of the max. correlation value is generally not displayed; the orientation angle is mainly needed to construct the orientedness and can then be discarded. By this image processing device a new line enhancing filter using multiple hypotheses testing to overcome the shortcomings of the above explained Hessian filter is applied. The main idea of the filter is to calculate for each voxel a line measure by correlating a model template of the line structure with the observed image data. Because of the large search space for a potential surface orientation in 3D, the proposed method is preferably applied to lines in 2D, i.e. it is desired to highlight the (generally thin) bright lines structures on cross-sectional images (preferably sagittal and coronal slice images) while suppressing other structures.

The present invention preferably provides a detection algorithm (also called filter) which preferably operates on 2D image slices and can be used as an input for further image processing such as 3D-model-based segmentation, 3D-region growing, etc. By use of application of the invention to a 2D image slice embodiments of the present invention will be explained in the following.

The filter provides a filter response yielding a goodness value (the maximum correlation value) and an estimated orientation for each image pixel. FIG. 2A shows as an example for an original input image a sagittal CT slice image after lung segmentation, showing pulmonary vessels and horizontal and vertical lobar fissure lines. FIG. 2B shows the filter response as goodness for each pixel (not shown is the filter response as estimated orientation for each pixel).

The proposed image processing device 10 assumes a certain model for the line and its neighbourhood. The model is generally not required to be quadratic. Preferably, a rectangular model is used having independent length and width w (for instance, of a size of at least 10×5 pixels). The model can be an image (e.g. a pixelmap) or an analytical function. For computation it is particularly efficient if the model function is separable in the principal direction $e_w$ and $e_L$ (e.g. x and y directions).

In a preferred embodiment an optional mask image M(x) is provided which gives the probability for each pixel that this pixel at location x is part of a region of interest, for instance an organ of interest (e.g. a lung) which information is e.g. derived from a segmentation of the original image. Alternatively, the mask image M(x) indicates if or if not a pixel belongs to the region of interest, e.g. by assigning a binary indication value (e.g. 0 or 1) to each pixel.

For each pixel in the image with M(x)>0, the (preferably linear) correlation of the model with the image pixels x' in an area of extent l×w centered around x is computed. The linear correlation coefficient is preferably computed as the ratio of the covariance of image and model intensity values over the variance of image and model intensities itself. Furthermore, the correlation is computed by using a weight factor for each pixel x', which is given by the product of the organ likelihood image M(x) and a bivariate Gaussian function G(x'−x) which peaks at the center of the model and vanishes towards the model boundaries. The covariance cov(IM) (symbol $\sigma^2_{IM}$) at point x is computed as $\sigma^2_{IM}(x)=\Sigma(I(x')-I_{mean})*(M(x')-M_{mean})*G(x'-x)*M(x')/\Sigma G(x'-x)*M(x')$ where x' is summed up by the summation over all pixel locations x' in the (rectangular) neighborhood mask around x, and $I_{mean}$ and $M_{mean}$ are the mean values in the neighborhood. The formulas for $\sigma^2_{II}$ and $\sigma^2_{MM}$ can be obtained by substitution of I and M, respectively.

The correlation is preferably computed for each of A orientations (angles; for instance for an angular range of 180°, wherein the angle is increased by 1° for each new computation). Then the highest of all A correlation values and its corresponding orientation angle θ are adopted as the filter output. The iteration over all directions (angles) can be done by rotation of the model into A different directions. However, if the model is separable into two principal directions, then it is computationally more efficient to rotate the image itself rather than the model.

An example of a fissure line model is shown in FIG. 3. The model patch is defined by its length in direction of the axis $e_L$ and its width w in direction of the axis $e_w$. The orientation of the line is in $e_L$ direction. The line profile $p(x_W)$ along the $e_W$ axis is given as the difference of two Gaussians with $\sigma_F$ for the fissure width and $\sigma_B$ for the dark background gap accompanying the fissure.

As an analytical model function for the lobar fissures the difference of two Gaussians A and B in the principal direction $e_w$ and a constant function in the principal direction $e_L$ are chosen in a preferred embodiment:

$$p(x_W) = Ae^{\frac{x_W^2}{2\sigma_F^2}} - Be^{\frac{x_W^2}{2\sigma_B^2}}$$

The linear correlation for each voxel between the model and the observed image data is e.g. computed as $$r_{IM}^2 = \frac{\sigma_{IM}^2}{\sigma_{II} * \sigma_{MM}},$$

where $\sigma_a$ gives the covariance, and $\sigma_{II}$ and $\sigma_{MM}$ give the standard deviations of observed image and model, respectively.

According to the present invention the detection of fissure line pieces which can be of different orientations in the data set is done by multiple hypotheses testing. For each voxel, the correlation of the model in different orientations with the corresponding image data is calculated. The hypothesis that gives the maximum correlation then belongs to the correct orientation of the line piece. To make the calculation of the correlation for a number of angles computationally efficient, the 2D image slice is rotated rather than rotating the model. In that way the necessary convolutions can be carried out for all slice pixels in an axis-parallel and thus separable fashion.

It is important to note that as output from the proposed line enhancing filter, i.e. the proposed method, for selected or each voxel the magnitude of correlation with the used model together with the optimal orientation is obtained. Thus, not only a fissure measure is obtained but also orientation information. Compared to the known Hessian filter, the proposed line enhancing filter allows defining the local neighbourhood to be evaluated via the length and the width w of the model. On the one hand, a larger neighbourhood around each voxel when calculating the linear correlation can be considered. One the other hand, in contrast to the Hessian filter that takes a symmetric neighbourhood, a rectangular line model can be defined that has a larger extension in direction of the line with a smaller extent perpendicular to the line. With this asymmetric model, more signal can be collected along the line direction while not considering a large neighbourhood around the line. At the same time, the parameters that define the shape of the profile represent the thickness of the line to be expected. The multi-scale Hessian filter does not offer this whole flexibility.

The output of the proposed method can be used to indicate in an original image, e.g. an original sagittal CT slice image as shown in FIG. 4A, the detected line structures (indicated in FIG. 4B a 20, 21, 22, 23, 24, 25) and, if of interest, the width of the filter model indicated by 30 as an example in FIG. 4B around line structure 20.

The present invention uses a correlation which generally is the ratio of covariance over the two individual variances, thus requiring three independent convolutions. It is the correlation (rather than simple convolution) which is essential for the capability of the suggested algorithm to detect lines which are much fainter in contrast than the surrounding image structures.

A further enhancement of the filter output can be achieved by additional algorithms, which are preferably carried out for selected or all pixels. These enhancements shall be illustrated by use of FIG. 5. FIG. 5A shows an original input image slice of a human lung. FIG. 5B shows an image in which the obtained maximum correlation values of the detected line structures.

In one embodiment all neighboring orientation angles $\theta$ and correlation values c around a pixel are sampled within a spherical neighborhood with a certain radius, weighted with a radial Gaussian weight function w. In another embodiment this result image is used again as an input image for the same filter procedure as before. This can be repeated in an iterative process.

In another embodiment the obtained angles $\theta$ are converted into vectors $v_\theta$ and summed up into a well-known structure tensor $T = \Sigma w \cdot c \cdot v_\theta \bullet v_\theta$, where $\bullet$ denotes an outer vector product as defined in J. Bigün and G. H. Granlund, "Optimal orientation detection of linear symmetry", Proceedings First International Conference on Computer Vision, IEEE Computer Society Press, 1987, pp. 433-438. The eigenvalues of T are computed and ordered by absolute magnitude. Then the local orientedness o is computed as the ratio of the first and second eigenvalue. The local orientedness is shown in FIG. 5C.

In still another embodiment for selected or all pixels a refined filter output is computed by (pixelwise) multiplication of the maximum linear correlation coefficient c (as shown in FIG. 5B) with the local orientedness o (as shown in FIG. 5C). The resulting image is depicted in FIG. 5D.

While generally a predetermined line model, e.g. from a database storing different line models e.g. depending on the kind of application, the kind of image data, the kind of object (patient), etc. is used, in further embodiments the line model can be more individualized, e.g. patient individual. Such an individual line model can e.g. be obtained from the original image data in which dimensions of the line structure to be detected may roughly be estimated to define a useful line model.

Any medical imaging application which requires delineation of organs or detection of interventional devices such as needles or guide wires can make use of the invention. But also in other fields the present invention can be applied for line structure detection, e.g. in material testing.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as

The invention claimed is:

1. An image processing device for detecting anatomical line structures in an image data set, comprising:
   a processor that:
   defines a line model of an anatomical line structure to be detected, said line model comprising a number of voxels; and said line model configured to define a two-dimensional rectangular line model having a predetermined length and width;
   calculates, per voxel of interest of said image data set, several correlation values of a correlation between said line model and an image area around said voxel of interest, said image area comprising a corresponding number of voxels as said line model, wherein for each of a number of different relative orientations of said line model with respect to said image area a respective correlation value is calculated, and wherein said processor is configured to calculate, per pixel of interest of two-dimensional image data set, several correlation values of a correlation between said two-dimensional rectangular line model and a two-dimensional image area around said pixel of interest;
   determines, per voxel of interest, a maximum correlation value from said calculated correlation values, which detects the anatomical line structure, and a corresponding optimal orientation at which said maximum correlation value is obtained; and
   identifies within the image data set areas of voxels for which substantially the same optimal orientation has been found, determines, per voxel of interest, a local orientedness value and multiplies, per voxel of interest, said local orientedness value with the maximum correlation value to obtain an amplified maximum correlation value.

2. The image processing device as claimed in claim 1, wherein said processor is further configured to calculate, per voxel of interest of said image data set, several correlation values of a linear correlation between said line model and an image area around said voxel of interest.

3. The image processing device as claimed in claim 2, wherein said processor is further configured to calculate, per voxel of interest of said image data set, several correlation values of said linear correlation between said line model and an image area around said voxel of interest by calculating the ratio of the covariance of intensity values of said image area and said line model over the variance of the intensity values of said image area and variance of the intensity values of said line model.

4. The image processing device as claimed in claim 1, wherein said processor is further configured to define a two-dimensional rectangular line model having a larger extension in a direction along the line structure to be detected than in a direction perpendicular to the line structure to be detected.

5. The image processing device as claimed in claim 1, wherein said processor is further configured to repeat the steps of calculating and determining for different two-dimensional image data sets, in particular different image slices of a three-dimensional image data set.

6. The image processing device as claimed in claim 1, wherein said processor is further configured to define a three-dimensional cuboidal line model having a predetermined length, width and height.

7. The image processing device as claimed in claim 1, wherein said processor is further configured to define a map of voxels or an analytical function as line model.

8. The image processing device as claimed in claim 1, wherein said processor is further configured to initially define a general line model of the line structure to be detected and to use the maximum correlation values and the corresponding optimal orientations obtained by use of said general line model to define a refined line model of the line structure to be detected, and configured to repeat the steps of calculating and determining by use of said refined line model.

9. The image processing device as claimed in claim 1, wherein said processor is further configured to calculate said correlation values only for voxels belonging to a predetermined region of interest and to determine if a voxel belongs to said predetermined region of interest based on a mask image indicating if a voxel belongs to said predetermined region of interest or a probability value of the probability that a voxel belongs to said predetermined region of interest.

10. The image processing device as claimed in claim 1, wherein said processor is further configured to calculate, per voxel of interest of said image data set, several correlation values of a correlation between said line model and an image area around said voxel of interest for different relative orientations of said line model with respect to said image area by rotating said line model and/or said image area around said voxel of interest to change the relative orientation.

11. The image processing device as claimed in claim 1, wherein the processor replaces an original value of a voxel with the obtained maximum correlation value for the voxel.

12. The image processing device as claimed in claim 1, wherein the processor employs a line enhancing filter using multiple hypotheses.

13. An image processing method for detecting anatomical line structures in image data set, comprising:
   defining a line model of an anatomical line structure to be detected, said line model comprising a number of voxels; and said line model defining a two-dimensional rectangular line model having a predetermined length and width;
   calculating, per voxel of interest of said image data set, several correlation values of a correlation between said line model and an image area around said voxel of interest, said image area comprising a corresponding number of voxels as said line model, wherein for each of a number of different relative orientations of said line model with respect to said image area a respective correlation value is calculated, and wherein per pixel of interest of two-dimensional image data set, several correlation values of a correlation between said two-dimensional rectangular line model and a two-dimensional image area around said pixel of interest are calculated;
   determining, per voxel of interest, a maximum correlation value from said calculated correlation values, which detects the anatomical line structure, and a corresponding optimal orientation at which said maximum correlation value is obtained;
   determining, per voxel of interest, a local orientedness value;
   constructing a new image using as voxel values the orientedness value and multiplying, per voxel of interest, said local orientedness value with the obtained maximum correlation value.

14. A non-transitory computer readable storage medium storing a computer program for causing a computer to carry out the steps of:

defining a line model of an anatomical line structure to be detected, said line model comprising a number of voxels; and said line model defining a two-dimensional rectangular line model having a predetermined length and width;

calculating, per voxel of interest of said image data set, several correlation values of a correlation between said line model and an image area around said voxel of interest, said image area comprising a corresponding number of voxels as said line model, wherein for each of a number of different relative orientations of said line model with respect to said image area a respective correlation value is calculated, and wherein per pixel of interest of two-dimensional image data set, several correlation values of a correlation between said two-dimensional rectangular line model and a two-dimensional image area around said pixel of interest are calculated;

determining, per voxel of interest, a maximum correlation value from said calculated correlation values, which detects the anatomical line structure, and a corresponding optimal orientation at which said maximum correlation value is obtained;

determining, per voxel of interest, a local orientedness value;

constructing a new image using as voxel values the orientedness value and multiplying, per voxel of interest, said local orientedness value with the obtained maximum correlation value.

15. The non-transitory computer readable storage medium as claimed in claim 14, further comprising:

performing the calculating and determining steps with a non-Hessian filter.

16. The non-transitory computer readable storage medium as claimed in claim 14, further comprising:

calculating, for each voxel, a line measure by correlating a model template of the line structure with observed image data.

* * * * *